US 6,641,149 B2

(12) United States Patent  
Chiappetta et al.

(10) Patent No.: US 6,641,149 B2
(45) Date of Patent: Nov. 4, 2003

(54) CHILDREN'S WAGON WITH IMPROVED REMOVABLE WALLS

(75) Inventors: Gary T. Chiappetta, Hinsdale, IL (US); Bryan M. Fox, Chicago, IL (US); Joel V. Koster, Chicago, IL (US); Frederick J Michelau, Des Plaines, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 09/941,102

(22) Filed: Aug. 27, 2001

(65) Prior Publication Data
US 2003/0038440 A1 Feb. 27, 2003

(51) Int. Cl.[7] .................................................. B62B 9/00
(52) U.S. Cl. ................................. 280/87.01; 280/87.021
(58) Field of Search ........................ 28/47.34, 47.38, 28/79.11, 79.2, 87.01, 87.021; 403/339, 340; 256/25, 26

(56) References Cited

U.S. PATENT DOCUMENTS

| 1,099,924 | A | * | 6/1914 | Johnson ........................ 296/43 |
| 3,577,105 | A | * | 5/1971 | Jones, Jr. ....................... 333/239 |
| 3,809,435 | A |   | 5/1974 | Morris |
| 4,930,831 | A |   | 6/1990 | Valiga et al. |
| 4,963,115 | A |   | 10/1990 | Davin et al. |
| 5,358,314 | A |   | 10/1994 | Spadotto |
| 5,360,222 | A |   | 11/1994 | Bro et al. |
| 5,480,180 | A |   | 1/1996 | Fuller et al. |
| 5,529,323 | A |   | 6/1996 | vom Braucke et al. |
| 5,669,617 | A |   | 9/1997 | Pasin et al. |
| 5,957,482 | A | * | 9/1999 | Shorter ........................ 280/639 |
| 6,176,759 | B1 |   | 1/2001 | Trageser |
| 6,363,678 | B1 | * | 4/2002 | Shuler ........................ 52/656.9 |
| 6,446,981 | B1 | * | 9/2002 | Wise et al. ................. 280/7.17 |

* cited by examiner

Primary Examiner—Brian L. Johnson
Assistant Examiner—Christopher Bottorff
(74) Attorney, Agent, or Firm—Piper Rudnick LLP

(57) ABSTRACT

A children's wagon has a molded plastic body including a horizontal floor with surrounding pockets. The wagon also includes front and rear wheels with the former mounted upon a pivoting bolster to which a handle is attached. Molded plastic front, rear and side walls surround the horizontal floor and are removably fastened to the body via their bottom edges by tabs and hook projections that engage the wagon body pockets. Horizontal surfaces are formed adjacent to the side edges of the front, rear and side walls. A knob and a cup are formed on each horizontal surface. The knobs of the side walls engage the cups of the front and rear walls while the knobs of the front and rear walls engage the cups of the side walls so that the front, rear and side walls are joined together in a secure but removable fashion.

20 Claims, 11 Drawing Sheets

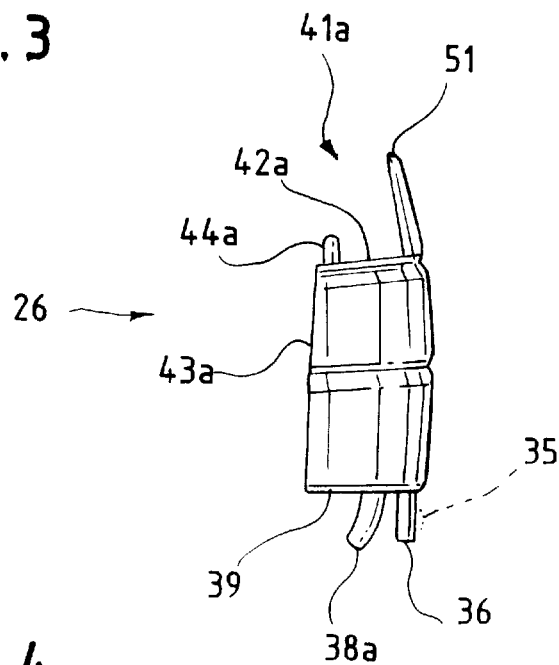
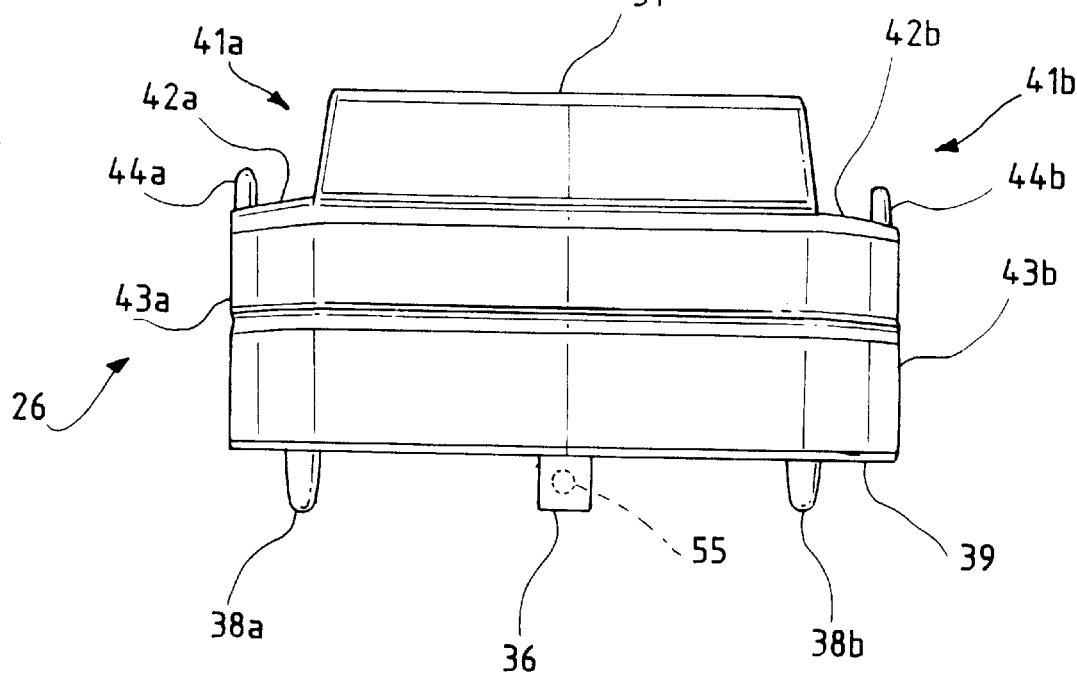

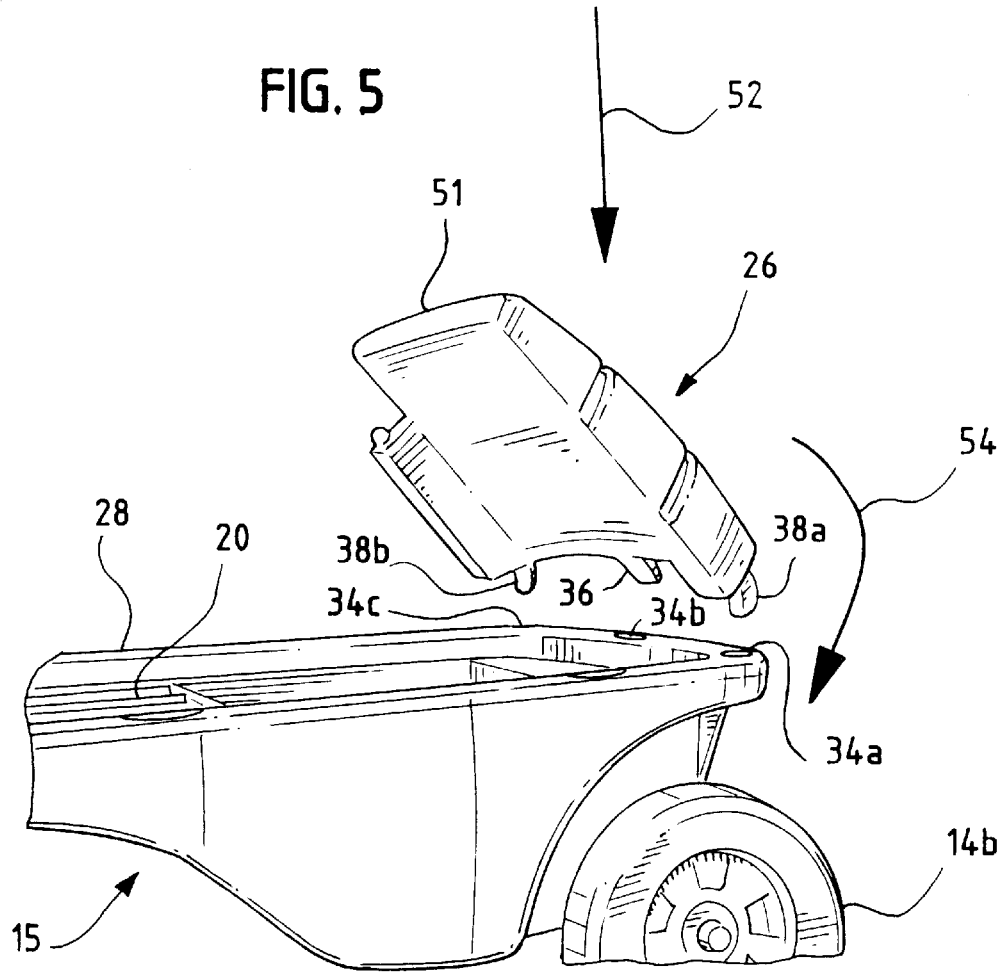

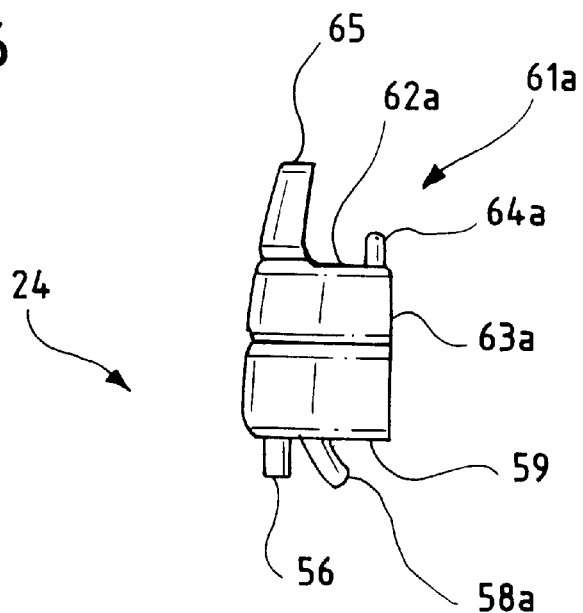
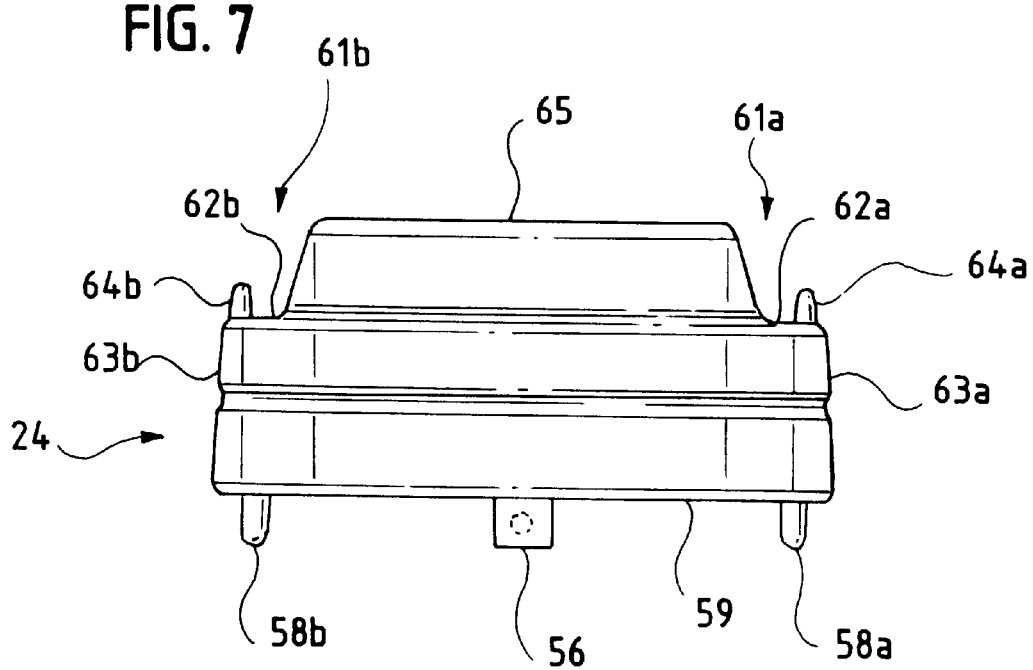

CHILDREN'S WAGON WITH IMPROVED REMOVABLE WALLS

BACKGROUND

The invention relates generally to children's wagons and, more particularly, to a children's wagon having improved removable walls.

Children's wagons are well-known in the art. The typical wagon includes a horizontal supporting surface or floor where a child may sit or cargo may reside, side walls extending up from the horizontal supporting surface to prevent the child or cargo from falling out of the wagon, front and back wheel assemblies for movement and some type of handle attached to the wagon body whereby a user may pull the wagon.

Wagons often include removable side walls so that the wagon may be more easily transported, in the trunk of a car, for example, or stored. In addition, wagons with removable side walls more easily accommodate oversized cargo.

U.S. Pat. No. 5,529,323 to vom Braucke et al. discloses a wagon with removable side walls. The wagon of the vom Braucke et al. '323 patent includes a horizontal supporting surface mounted upon a frame that includes the front and rear wheel assemblies. The frame also includes a number of open-ended poles that protrude above the supporting surface. The poles accept vertical projections from the right and left side walls to secure the side walls to the wagon frame. The opposing and generally vertical edges of the front and rear walls slide into grooves formed in the right and left side walls so that the horizontal supporting surface is surrounded. Because the front and rear walls are not locked down to the frame or supporting surface, the cargo, whether it is children or some type of material, could fall out of the front or back of the wagon by knocking the side walls out of position. Moreover, a child could have difficulty assembling this wagon since it requires significant coordination to align the -front and rear walls with the left and right side walls to form the cargo area.

U.S. Pat. No. 5,669,617 to Pasin et al. describes a wagon with an improved removable wall arrangement. The wagon of the Pasin et al. '617 patent includes a horizontal supporting surface surrounded by front and rear walls and right and left side walls. Each such wall consists of a number of horizontal rails and a pair of vertical legs. The horizontal rails and vertical legs are either held together by fasteners or are formed as a one-piece molded part with simulated fasteners. The side walls include horizontal-extending tangs formed on their ends. The tangs engage corresponding recesses formed on the ends of the front and rear walls. Each wall also includes vertical tabs which extend downward and interlock with pockets formed in the horizontal supporting surface. While the wagon of the Pasin et al. '617 patent offers a significantly improved removable wall arrangement, room for improvement still exists in terms of ease of wall assembly and sturdiness.

Other wagon designs do little to improve upon the prior art in terms of ease of wall assembly and/or sturdiness. U.S. Pat. No. 5,360,222 to Bro et al. illustrates a toy wagon having a seat that is large enough for a child to sit upon. The wagon includes front, rear and side walls that enclose the seat. Similar to the wagon designs of the patents described above, the walls of the Bro et al. '222 patent are removably attached to the wagon. In particular, the walls feature downward-extending tabs that are slid into corresponding receptacles formed in the body of the wagon. The side walls, however, do not attach to one another. Such an arrangement does not provide optimal structural support or stability for items and/or children positioned upon the seat.

U.S. Pat. No. 4,930,831 to Valiga et al. discloses a wagon with a pair of opposing and removable wall extension sections. Each single-piece section is roughly "C-shaped" and features a side portion and front and rear portions. The side portion extends the length of the wagon while the front and rear portions each extend halfway across the width of the wagon. Each section also includes a horizontal groove formed in its side and positioned near its bottom edge. The groove of each section accommodates a rim or lip circumferentially positioned upon the tops of the permanent walls of the wagon. Each end of each section is provided with a slot or tab that engages a tab or slot that is formed upon or in a facing end of the other section. The two wall extension sections are positioned upon the wagon so that their grooves receive the permanent wall circumferential rim and the tabs and slots of their ends engage one another. The tabs and slots of the ends of the sections secured together by screws. As such, the side extension sections of the Valiga et al. '831 patent require tools for installation and removal to and from the wagon.

Accordingly, it is an object of the present invention to provide a children's wagon with removable walls that may be securely assembled to both one another and the wagon.

It is a further object of the present invention to provide a children's wagon with removable walls that may be easily assembled to both one another and the wagon.

It is a further object of the invention to provide a children's wagon with removable walls that may be installed or removed without the use of tools.

It is still a further object of the invention to provide a wagon with removable walls that is economical to manufacture.

It is still a further object of the invention to provide a wagon with removable walls that is durable.

Other objects and advantages will be apparent from the remaining portion of the specification.

SUMMARY OF THE INVENTION

The children's wagon of the present invention includes a body, preferably molded of plastic, including a horizontal floor with a surrounding lip. The surrounding lip has pockets formed therein. A pair of rear wheels are attached to the body as is a pivoting bolster. A pair of front wheels and a handle are attached to the bolster.

The wagon also includes front, rear and side walls that are preferably constructed of molded plastic. Each wall includes a bottom edge with at least one tab formed thereon. Each of the tabs is sized to engage one of the pockets of the wagon body. The bottom edges of the front and rear walls each also includes at least one hook projection. The hook projections also engage corresponding pockets formed in the wagon body. As a result, the walls are removably attached to the wagon body so as to surround the horizontal floor.

The front and rear walls each include a first side edge and a second side edge while the side walls each include a leading edge and a trailing edge. Horizontal surfaces are formed on each wall and are positioned adjacent to each of the side, leading and trailing edges. Each horizontal surface has a cup and a knob formed thereon. Each side wall cup is sized. to receive one of the front or rear wall knobs and each front and rear wall cup is sized to receive one of the side wall knobs so that the side walls are connected by their leading edges to the front wall and by their trailing edges to the rear wall.

The following detailed description of embodiments of the invention, taken in conjunction with the appended claims and the accompanying drawings, provide a more complete understanding of the nature and scope of the invention.

BRIEF DESCRIPTION OF THE DRAWINGS

FIG. 3 is an enlarged side elevation view of the rear wall of the wagon of FIG. 1;

FIG. 4 is a rear elevation view of the rear wall of FIG. 3;

FIG. 5 is a perspective view of the rear portion of the wagon of FIG. 1 with the side walls removed and the rear wall in the process of being installed;

FIG. 6 is an enlarged side elevation view of the front wall of the wagon of FIG. 1;

FIG. 7 is a front elevation view of the front wall of FIG. 6;

DETAILED DESCRIPTION OF THE PREFERRED EMBODIMENTS

Figure 1:
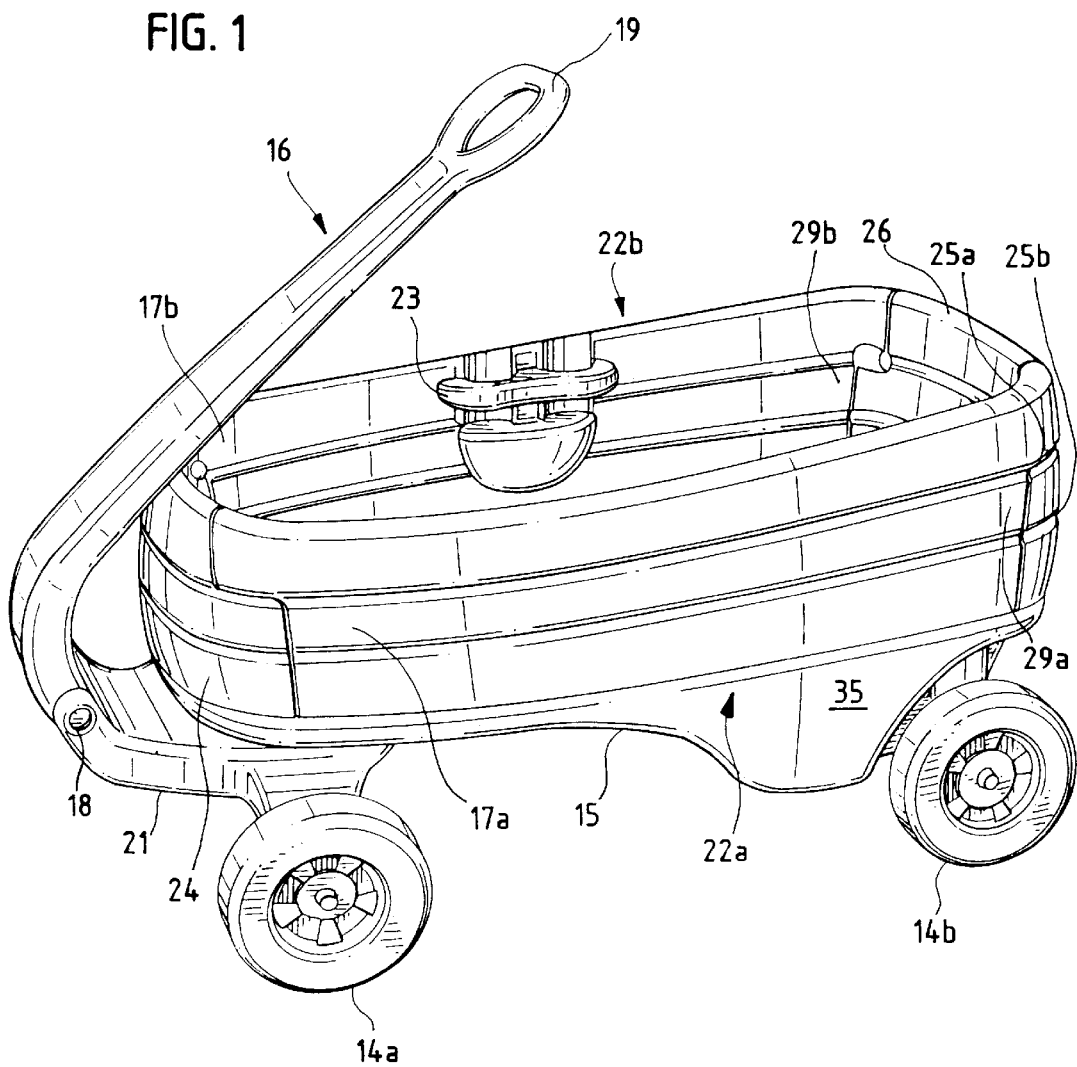
FIG. 1 is a perspective view of an embodiment of the wagon of the present invention with the walls installed.

A wagon constructed in accordance with the present invention is illustrated in FIG. 1. The wagon includes a wagon body 15, a pair of front wheels 14a, a pair of rear wheels 14b and a pulling and steering handle, indicated in general at 16. The rear wheels of the wagon are preferably mounted to the wagon body by a metal axle. The front wheels 14a of the wagon are mounted upon a bolster 21, also preferably by a metal axle. The bolster is pivotally connected to the bottom of the body 15. The handle 16 is pivotally connected to the bolster 21 through use of a hinge 18 and features a loop portion 19 for easy gripping.

The wagon also features left and right side walls, indicated in general at 22a and 22b, respectively, a front wall 24 and a rear wall 26. The left and right side walls include leading edges 17a and 17b, respectively, and trailing edges 29a and 29b, respectively. As will be explained below, the walls may be removed from the wagon to increase utility and ease of transport and storage. The wagon body, removable walls, bolster and handle preferably are constructed of molded plastic for durability and light weight. For strength, the walls are preferably molded with channels 25a and 25b. These channels present the appearance that the walls are constructed of stacked horizontal members and thus also serve an aesthetic purpose. A cup holder 23 may optionally be molded into the inner surface one or more of the walls.

Figure 2:
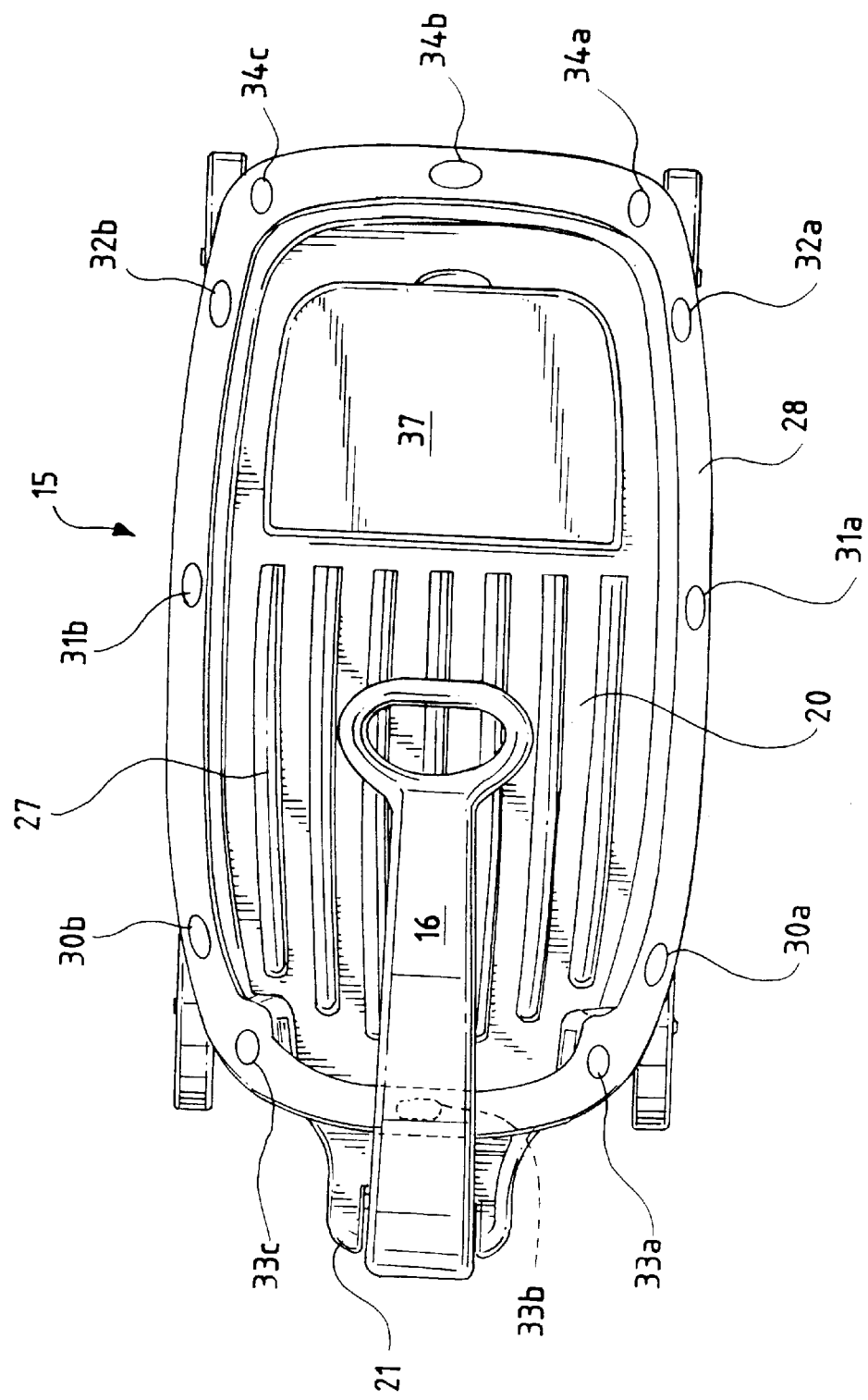
FIG. 2 is a top plan view of the wagon of FIG. 1 with the walls removed.

FIG. 2 shows a top view of the wagon with the front and rear walls, 24 and 26, respectively, and the side walls 22a and 22b of FIG. 1 removed. The wagon body, indicated in general at 15, consists of a horizontal floor 20. Ribs 27 may be molded into the horizontal floor to provide increased strength and traction. A lip 28 surrounds and extends slightly above the horizontal floor 20. The lip 28 includes side wall pockets 30a, 30b, 31a, 31b, 32a and 32b that extend downward into the body 15. In addition, lip 28 includes front wall pockets 33a–33c and rear wall pockets 34a–34c. As illustrated at 35 in FIG. 1, the body may optionally include a hollow storage compartment that is accessible by lifting the removable padded seat panel illustrated at 37 in FIG. 2.

The rear wall of FIG. 1 is indicated in general at 26 in FIGS. 3 and 4. The rear wall includes a downward extending center tab 36 mounted to its bottom edge 39 that is flanked by hook projections 38a and 38b. The rear wall also includes cutout portions 41a and 41b which define horizontal surfaces 42a and 42b that are positioned adjacent to side edges 43a and 43b. Knobs 44a and 44b are mounted upon the horizontal surfaces 42a and 42b of cutout portions 42a and 42b, respectively. As will be explained below, the knobs and cutout portions allow the rear wall to be secured to the left and right side walls (22a and 22b in FIG. 1).

The rear wall 26 is installed upon the wagon body 15 in the manner illustrated in FIG. 5. More specifically, the rear wall is lowered towards the wagon body, as indicated by arrow 52, and is oriented so that center tab 36 is aligned with pocket 34b and hook projections 38a and 38b are aligned with pockets 34a and 34c, respectively. The rear wall is then tilted with its top edge 51 urged towards the front of the wagon or floor 20, as illustrated in FIG. 5. Hook projections 38a and 38b are then inserted into pockets 34a and 34c as the rear wall is further lowered towards the wagon body in the direction indicated by arrow 52. The rear wall is then moved in the direction of arrow 54 so that the hook projections fully engage the pockets 34a and 34c and tab 36 engages pocket 34b.

As illustrated at 55 in FIGS. 3 and 4, tab 36 may optionally be equipped with a raised nub 55 to provide a tighter fit in pocket 34b. In addition, center tab 36 and hook projections 38a and 38b may be dimensioned so that a snug fit with their respective pockets is achieved when the rear wall is assembled to the wagon. While the rear wall will remain in place due to gravity, a snug fit between the hook projections and pockets and the center tab and the pocket will lend stability to the assembled walls and when it is desired to use the wagon without all of the walls in place. The same holds true for the tab and hook projections of the front wall and the tabs of the left and right side walls described below.

The front wall of FIG. 1 is indicated in general at 24 in FIGS. 6 and 7. Similar to the rear wall of FIGS. 3 and 4, the front wall includes a downward extending center tab 56 mounted to its bottom edge 59 that is flanked by hook projections 58a and 58b. The front wall also includes cutout portions 61a and 61b which define horizontal surfaces 62a and 62b that are positioned adjacent to side edges 63a and 63b. Knobs 64a and 64b are mounted on horizontal surfaces 62a and 62b, respectively. As with the rear wall, the knobs and cutout portions allow the front wall to be secured to the left and right side walls (22a and 22b in FIG. 1) as will be explained below.

The front wall 24 is attached to the wagon body 15 (FIGS. 1 and 2) in the manner illustrated for the rear wall 26 in FIG. 5. More specifically, the hook projections 58a and 58b of the front wall are inserted into pockets 33a and 33c of the wagon body (FIG. 1) while the front wall is tilted with its top edge 65 urged towards the rear or floor of the wagon. As the hook projections initially enter their respective pockets, the front wall is rotated towards a fully vertical orientation so that its center tab 56 is inserted into pocket 33b of the wagon body (FIG. 1) and the hook projections fully engage pockets 33a and 33c.

Once the front and rear walls are assembled to the wagon body, the left and right side walls, 22a and 22b in FIG. 1, may be installed. The left and right side walls each engage both the wagon body and the front and rear walls in a manner that will now be described.

Figure 8:
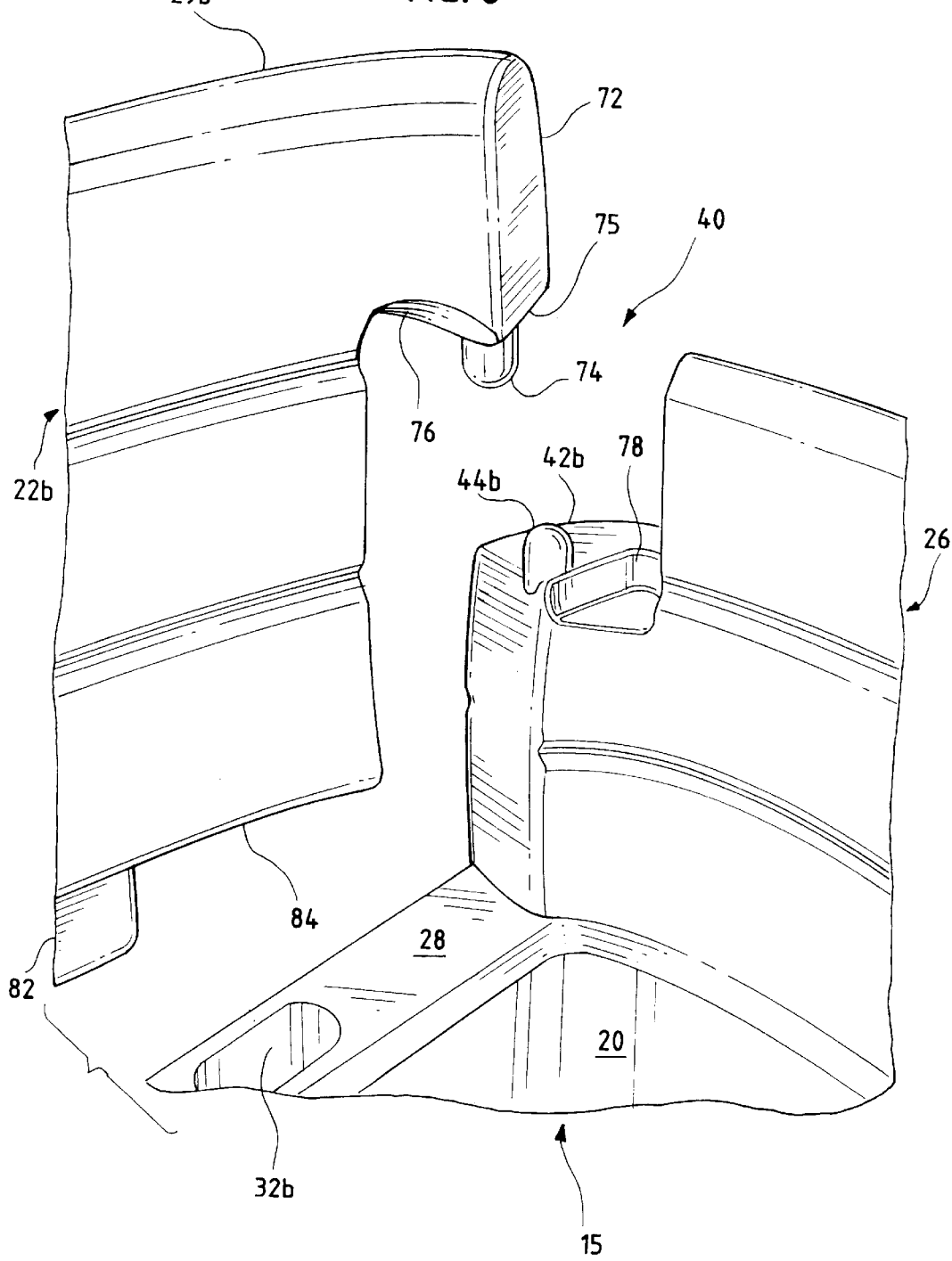
FIG. 8 is an enlarged top perspective exploded view of the right side and rear walls of the wagon of FIG. 1 in the process of being joined.
Figure 9:
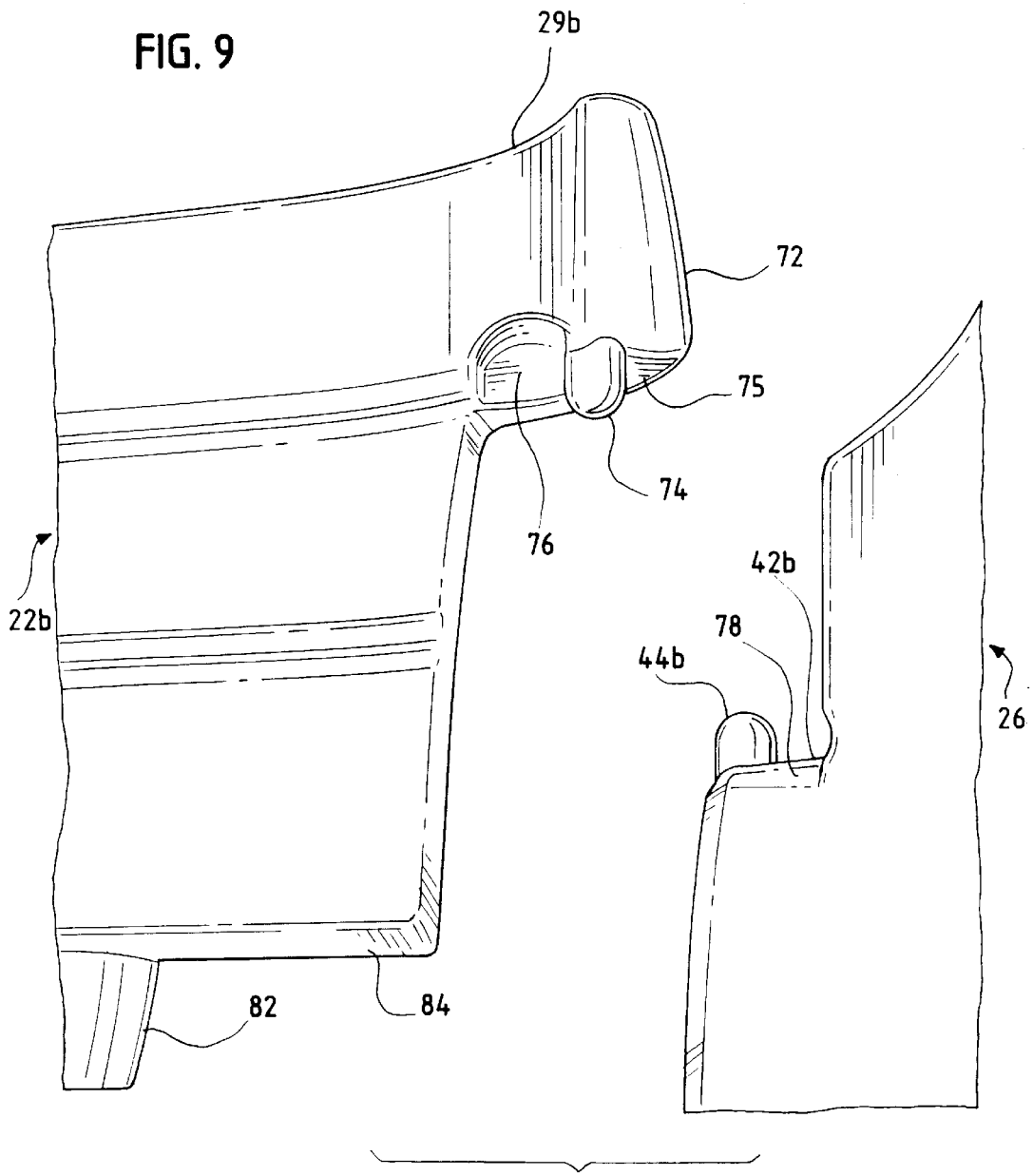
FIG. 9 is a bottom perspective view of the walls of FIG. 8.

As illustrated in FIGS. 8 and 9, the trailing end 29b of right side wall 22b includes a horizontally extending portion 72. A knob 74 extends downward from the underside 75 of the horizontally extending portion 72. In addition, a cup 76 is formed in the underside of the horizontally extending portion 72 between the downward extending knob 74 and the remaining portion of right side wall 22b.

As described with regard to FIGS. 3 and 4, rear wall 26 includes cutout portions defining horizontal surfaces 42a and 42b upon which knobs 44a and 44b are mounted. As illustrated in FIGS. 8 and 9, cup 78 is also formed in horizontal surface 42b between knob 44b and the remaining portion of rear wall 26. Though not shown in FIGS. 8 and 9, horizontal surface 42a in FIGS. 3 and 4 is also equipped with a cup positioned between knob 44a and the remaining portion of the rear wall.

As illustrated in FIG. 8, right side wall 22b includes a downward extending tab 82 positioned upon its bottom edge 84. Tab 82 engages pocket 32b when the wall is installed upon the wagon body 15. Right side wall 22b also includes two additional tabs extending downward from its bottom edge 84. These two additional tabs (not shown) are sized and positioned to engage pockets 30b and 31b of FIG. 2 when the wall is installed upon the wagon body 15.

The cup 78 of the rear wall is sized to receive the downward extending knob 74 of right side wall 22b. Likewise, the cup 76 of the right side wall is sized to receive-the knob 44b of the rear wall. As a result, as tab 82 of the right side wall is being lowered into pocket 32b, and the remaining right side wall tabs are being lowered into pockets 30b and 31b, knob 74 engages cup 78 while knob 44b engages cup 76. The somewhat enlarged configurations of cups 76 and 78 facilitate molding of the walls during production and also the introduction of the appropriate knobs during assembly.

Figure 10:
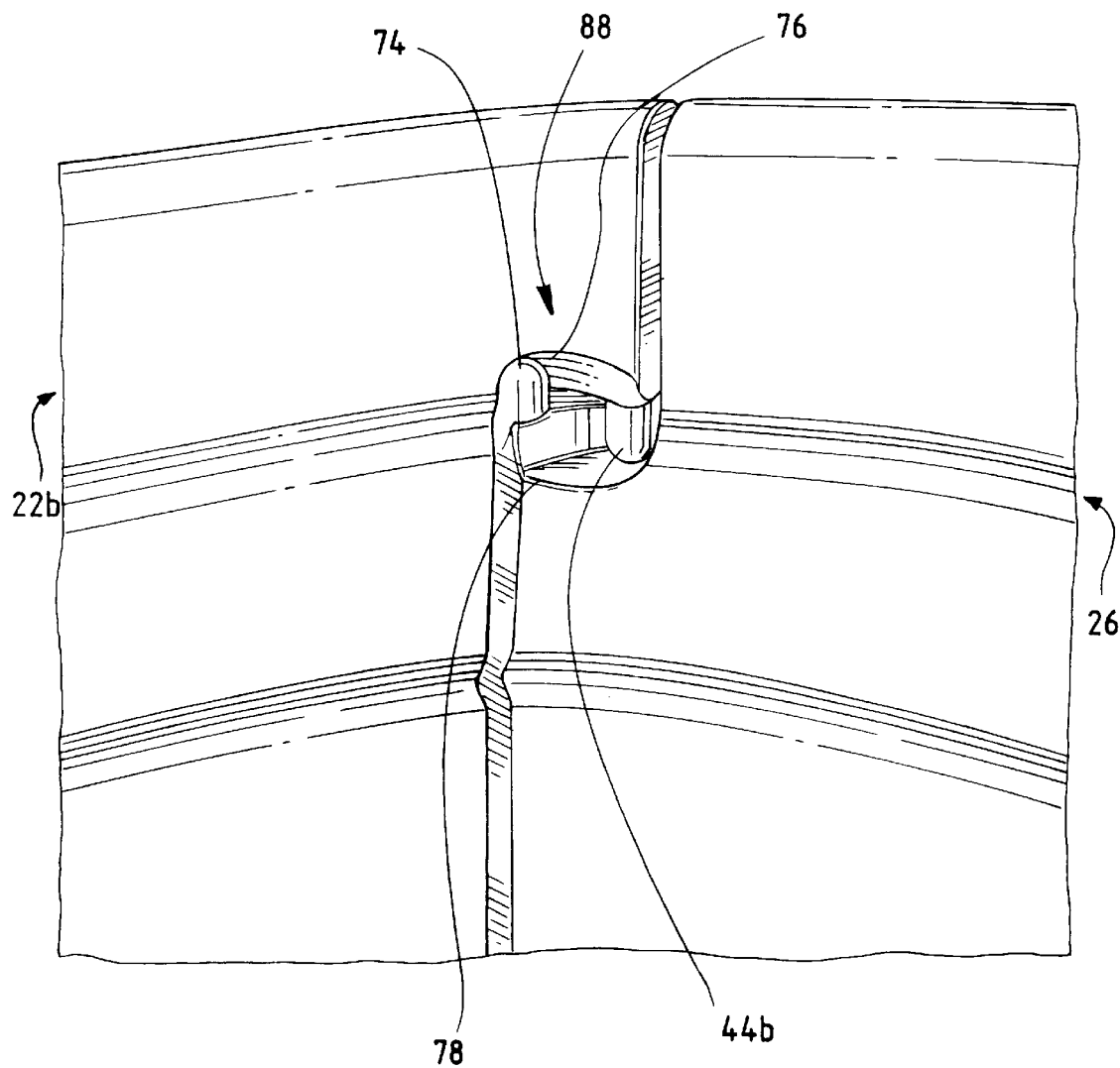
FIG. 10 is a perspective view of the walls of FIGS. 8 and 9 after they have been joined.

The installed rear and right side walls form the joint indicated. in general at 88 in FIG. 10. The interaction of the knobs 44b and 74 with cups 78 and 76, respectively, results in the walls being joined in an interlocking fashion thus preventing movement of the right side and rear walls relative to each other in a number of directions. As a result, the joint is very strong, however, it may be easily disassembled by lifting right side wall 22b.

As illustrated in FIG. 5, due to hook projections 38a and 38b, the rear wall 26 must be tilted with its top edge urged forward before it can be removed from the wagon body 15. The right side wall 22b, and/or left side wall 22a, when installed prevents the rear wall 26 from being tilted forward. As a result, the installation of one or more of the side walls in effect locks the rear wall into the wagon body. Due to the similarity of construction of the front and rear walls, the installation of one or more of the side walls also locks the front wall into the wagon body.

Figure 11:
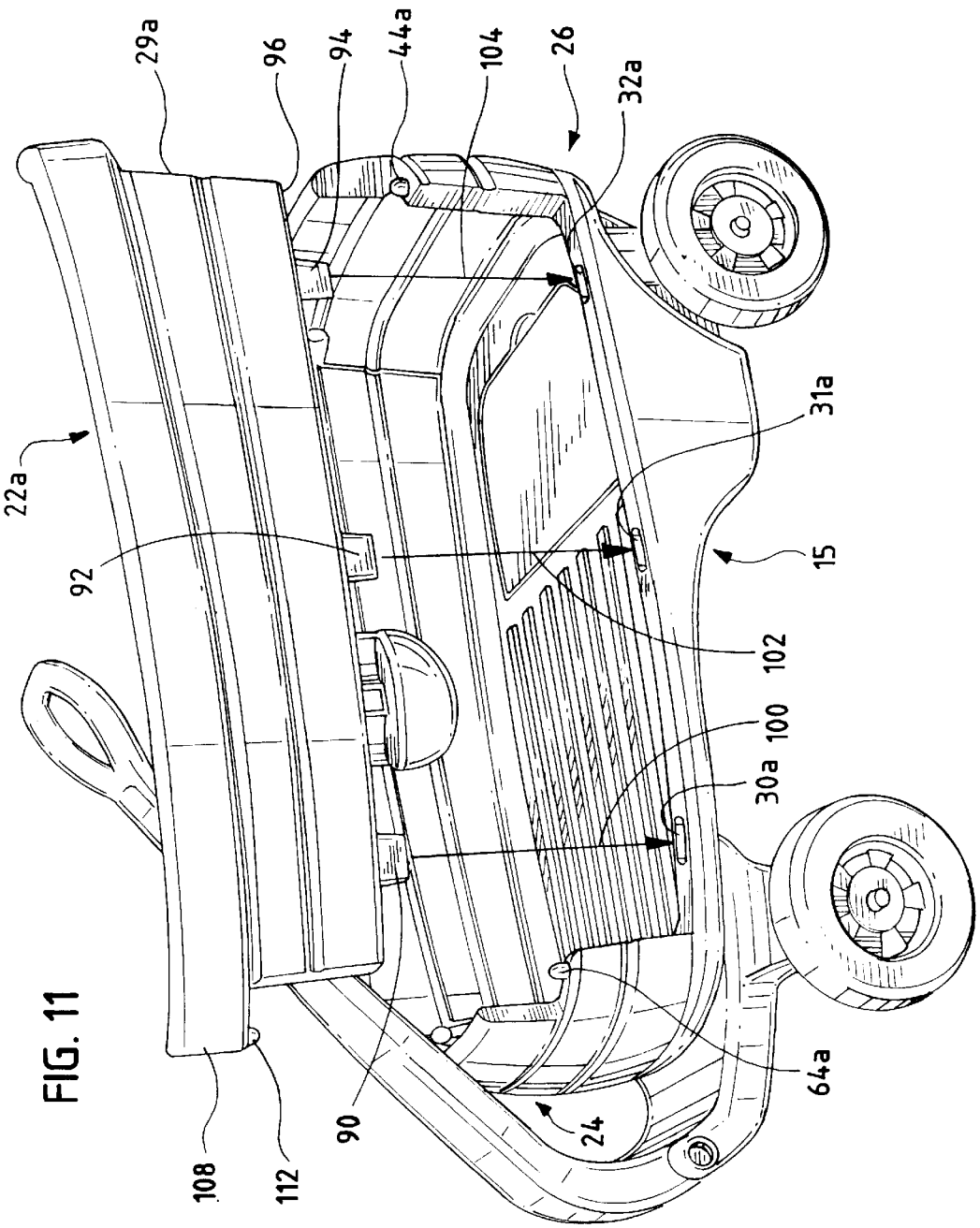
FIG. 11 is a perspective exploded view of the wagon of FIG. 1 with the front, rear and right side walls installed with the left side wall in the process of being installed.

The final step in installing the wagon walls is to install the left side wall 22a, as illustrated in FIG. 11. Similar to the right side wall, the left side wall features three tabs 90, 92 and 94 extending downward from its bottom edge 96. The left side wall is installed by aligning tabs 90, 92 and 94 with pockets 30a, 31a and 32a, respectively, and lowering the left side wall toward the wagon body as indicated by arrows 100, 102 and 104.

Figure 12:
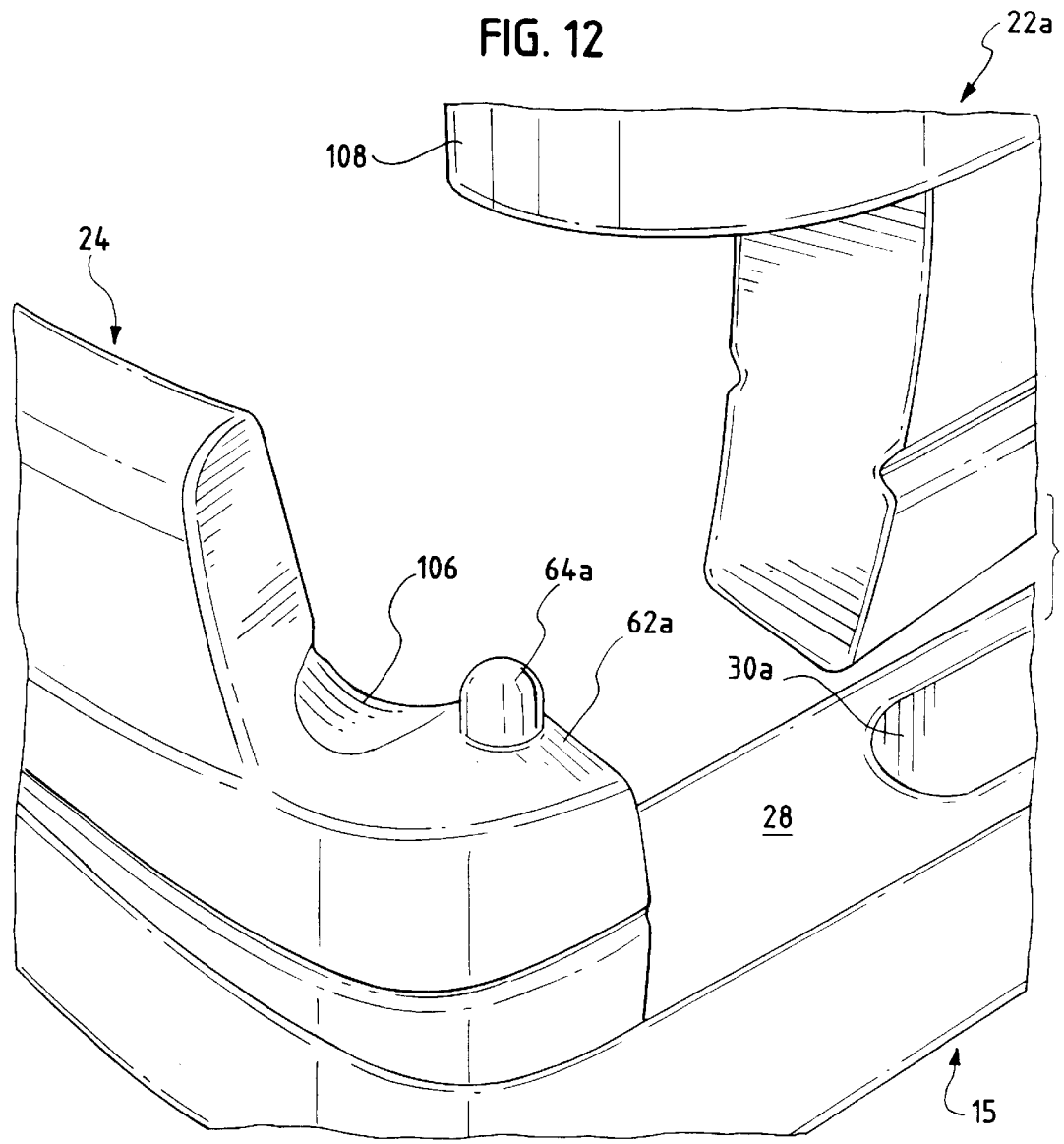
FIG. 12 is an enlarged top perspective exploded view of the left side and front walls of the wagon of FIG. 1 in the process of being joined.

As indicated in FIG. 12, the horizontal surface 62a of front wall 24 is equipped with knob 64a and a cup 106. Though not shown in FIGS. 12 and 13, horizontal surface 62b in FIGS. 6 and 7 is also equipped with a cup positioned between knob 64b and the remaining portion of the front wall.

Figure 13:
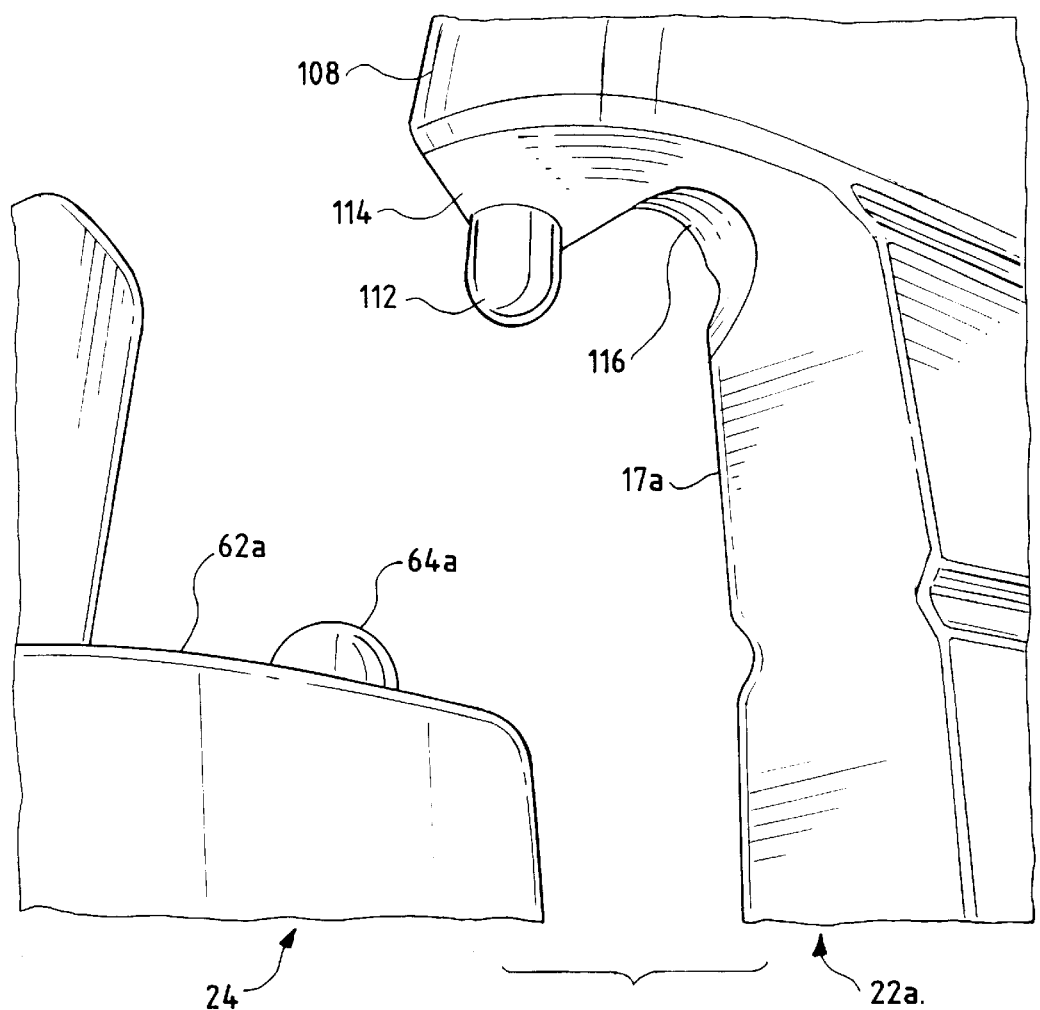
FIG. 13 is a bottom perspective view of the walls of FIG. 12.

As illustrated in FIG. 13 (and FIG. 11), the leading edge 17a of left side wall 22a includes a horizontally extending portion 108. A knob 112 extends downward from the underside 114 of the horizontally extending portion 108. In addition, a cup 116 is formed in the underside of the horizontally extending portion 108 between the downward extending knob 112 and the remaining portion of right side wall 22a.

The cup 106 (FIG. 12) of the front wall is sized to receive the downward extending knob 112 (FIGS. 11 and 13) of left side wall 22a. Likewise, the cup 116 of the left side wall is sized to receive the knob 64a of the front wall. As a result, as the left wall is being lowered into the installed position, as illustrated in FIG. 11, knob 64a engages cup 116 while knob 112 engages cup 106. The somewhat enlarged configurations of cups 106 and 116 facilitate introduction of the appropriate knobs and, in addition, facilitate the molding of the walls during the productions process. The installed front and left side walls form a joint similar to the one illustrated in, and described with reference to, FIG. 10.

The trailing edge 29a (FIG. 11) of the left side wall 22a features a structure that is the mirror image of the horizontally extending portion 72, knob 74 and cup 76 of FIG. 8. The right side wall leading end features a structure that is the mirror image of the extending portion 108, knob 112 and cup 116 of FIG. 13. As a result, both the right front and left rear corners of the wagon, when the walls are installed, feature joints such as the one illustrated in, and described with respect to, FIG. 10.

While the preferred embodiments of the invention have been shown and described, it will be apparent to those skilled in the art that changes and modifications may be made therein without departing from the spirit of the invention, the scope of which is defined by the appended claims.

What is claimed is:

1. A children's wagon comprising:
 a) a body including a generally horizontal floor;
 b) a pair of front wheels and a pair of rear wheels rotatably attached to the body;
 c) a handle attached to the body;
 d) front and rear walls removably connected to the wagon body, said front and rear walls each including a first side edge and a second side edge;
 e) a pair of side walls removably connected to the wagon body, each including a leading edge and a trailing edge;
 f) each of said front and rear walls including a first horizontal surface positioned adjacent to the first side edge and a second horizontal surface positioned adjacent to the second side edge, each of said first and second horizontal surfaces having a semispherical cup and a semispherical knob, said semispherical cup and semispherical knob formed independently of one another with the knob formed upon and extending from the horizontal surface and the cup forming an indentation in the horizontal surface;

g) each of said pair of side walls including a leading horizontal surface positioned adjacent to the leading edge and a trailing horizontal surface positioned adjacent to the trailing edge, each of said leading and trailing horizontal surfaces having a semispherical cup and a semispherical knob, said semispherical cup and semispherical knob formed independently of one another with the knob formed upon and extending from the horizontal surface and the cup forming an indentation in the horizontal surface; and h) each of said side wall cups sized to receive one each of the front and rear wall knobs and each of said front and rear wall cups sized to receive one of each of the side wall knobs so that said side walls are removably connected by their leading edges to the front wall and by their trailing edges to the rear wall so that the horizontal floor of the wagon body is generally surrounded.

2. The wagon of claim 1 wherein said front, rear and sides walls each include a bottom edge with at least one tab formed thereon and said body includes a plurality of tab pockets formed therein along a periphery of the generally horizontal floor, each of said tabs sized to engage an independent one of said tab pockets;

whereby said front, rear and side walls are removably connected to the wagon body.

3. The wagon of claim 2 wherein the body includes a lip formed around the periphery of the floor with the tab pockets formed therein.

4. The wagon of claim 2 wherein said front and rear walls each include a bottom edge with at least one hook projection formed thereon and said body includes a plurality of hook projection pockets formed therein along a periphery of the generally horizontal floor, each of said hook projections sized to engage an independent one of said hook projection pockets;

whereby said front, rear and side walls are removably connected to the wagon body.

5. The wagon of claim 4 wherein said front and rear walls include top edges and the hook projections are shaped such that the front and rear walls must be tilted with their top edges urged towards the wagon floor as the hook projections are initially inserted into the hook projection pockets.

6. The wagon of claim 1 wherein said front and rear walls each include a bottom edge with at least one hook projection formed thereon and said body includes a plurality of hook projection pockets formed therein along a periphery of the generally horizontal floor, each of said hook projections sized to engage an independent one of said hook projection pockets;

whereby said front, rear and side walls are removably connected to the wagon body.

7. The wagon of claim 6 wherein said front and rear walls include top edges and the hook projections are shaped such that the front and rear walls must be tilted with their top edges urged towards the wagon floor as the hook projections are initially inserted into the hook projection pockets.

8. The wagon of claim 1 wherein the knobs formed on the first horizontal surfaces of the front and rear walls are positioned closer to the first edges of the front and rear walls than the cups formed on the first horizontal surfaces of the front and rear walls and the knobs formed on the second horizontal surfaces of the front and rear walls are positioned closer to the second edges of the front and rear walls than the cups formed on the second horizontal surfaces of the front and rear walls.

9. The wagon of claim 1 wherein said front and rear walls each include cutouts at their first and second edges upon which said first and second horizontal surfaces are positioned, respectively, and where said sides walls each include horizontally extending portions at their leading and trailing edges under which said leading horizontal surfaces and trailing surfaces are positioned, respectively.

10. The wagon of claim 1 further comprising a bolster pivotally attached to the body with said pair of front wheels and said handle attached to said bolster.

11. The wagon of claim 1 wherein said front, rear and side walls are made from plastic with channels molded therein.

12. The wagon of claim 1 wherein said body is made from plastic and includes a storage compartment.

13. An improved removable wall arrangement for a children's wagon, where the children's wagon includes a body having a horizontal floor, a pair of front wheels and a pair of rear wheels rotatably attached to the body and a handle attached to the body, the improved removable wall arrangement comprising:

a) front and rear walls adapted to be removably connected to the wagon body, said front and rear walls each including a first side edge and a second side edge;

b) a pair of side walls adapted to be removably connected to the wagon body, each including a leading edge and a trailing edge;

c) each of said front and rear walls including a first horizontal surface positioned adjacent to the first side edge and a second horizontal surface positioned adjacent to the second side edge, each of said first and second horizontal surfaces having a semispherical cup and a semispherical knob, said semispherical cup and semispherical knob formed independently of one another with the knob formed upon and extending from the horizontal surface and the cup forming an indentation in the horizontal surface;

d) each of said pair of side walls including a leading horizontal surface positioned adjacent to the leading edge and a trailing horizontal surface positioned adjacent to the trailing edge, each of said leading and trailing horizontal surfaces having a semispherical cup and a semispherical knob, said semispherical cup and semispherical knob formed independently of one another with the knob formed upon and extending from the horizontal surface and the cup forming an indentation in the horizontal surface; and e) each of said side wall cups sized to receive one each of the front and rear wall knobs and each of said front and rear wall cups sized to receive one of each of the side wall knobs so that said side walls may be removably connected by their leading edges to the front wall and by their trailing edges to the rear wall so that the horizontal floor of the wagon body is generally surrounded.

14. The wall arrangement of claim 13 wherein the knobs formed on the first horizontal surfaces of the front and rear walls are positioned closer to the first edges of the front and rear walls than the cups formed on the first horizontal surfaces of the front and rear walls and the knobs formed on the second horizontal surfaces of the front and rear walls are positioned closer to the second edges of the front and rear walls than the cups formed on the second horizontal surfaces of the front and rear walls.

15. The wagon of claim 13 wherein said front and rear walls each include cutouts at their first and second edges upon which said first and second horizontal surfaces are positioned, respectively, and where said sides walls each include horizontally extending portions at their leading and trailing edges under which said leading horizontal surfaces and trailing surfaces are positioned, respectively.

16. A children's wagon comprising:
  a) a body including a generally horizontal floor;
  b) a pair of front wheels and a pair of rear wheels rotatably attached to the body;
  c) a handle attached to the body;
  d) front and rear walls removably connected to the wagon body, said front and rear walls each including a first side edge and a second side edge and each of said front and rear walls including a first semispherical knob and a first semispherical cup formed independently of one another thereon adjacent to the first side edge and a second semispherical knob and a second semispherical cup formed independently of one another thereon adjacent to the second side edge;
  e) a pair of side walls removably connected to the wagon body, each including a leading edge and a trailing edge and each of said pair of side walls including a leading semispherical knob and a leading semispherical cup formed independently of one another thereon adjacent to the leading edge and a trailing semispherical knob and a trailing semispherical cup formed independently of one another thereon adjacent to the trailing edge; and
  f) each of said side wall cups sized to receive one each of the front and rear wall knobs and each of said front and rear wall cups sized to receive one of each of the side wall knobs so that said side walls are removably connected by their leading edges to the front wall and by their trailing edges to the rear wall so that the horizontal floor of the wagon body is generally surrounded.

17. The wagon of claim 16 wherein said front, rear and sides walls each include a bottom edge with at least one tab formed thereon and said body includes a plurality of tab pockets formed therein along a periphery of the generally horizontal floor, each of said tabs sized to engage an independent one of said tab pockets;
  whereby said front, rear and side walls are removably connected to the wagon body.

18. The wagon of claim 16 wherein said front and rear walls each include a bottom edge with at least one hook projection formed thereon and said body includes a plurality of hook projection pockets formed therein along a periphery of the generally horizontal floor, each of said hook projections sized to engage an independent one of said hook projection pockets;
  whereby said front, rear and side walls are removably connected to the wagon body.

19. An improved removable wall arrangement for a children's wagon, where the children's wagon includes a body having a horizontal floor, a pair of front wheels and a pair of rear wheels rotatably attached to the body and a handle attached to the body, the improved removable wall arrangement comprising:
  a) front and rear walls adapted to be removably connected to the wagon body, said front and rear walls each including a first side edge and a second side edge and each of said front and rear walls including a first semispherical knob and a first semispherical cup formed independently of one another thereon adjacent to the first side edge and a second semispherical knob and a second semispherical cup formed independently of one another thereon adjacent to the second side edge;
  b) a pair of side walls adapted to be removably connected to the wagon body, each including a leading edge and a trailing edge and each of said pair of side walls including a leading semispherical knob and a leading semispherical cup formed independently of one another thereon adjacent to the leading edge and a trailing semispherical knob and a trailing semispherical cup formed independently of one another thereon adjacent to the trailing edge; and
  c) each of said side wall cups sized to receive one each of the front and rear wall knobs and each of said front and rear wall cups sized to receive one of each of the side wall knobs' so that said side walls are removably connected by their leading edges to the front wall and by their trailing edges to the rear wall so that the horizontal floor of the wagon body is generally surrounded.

20. The wagon of claim 19 wherein said front, rear and side walls are made from plastic with channels molded therein.

* * * * *